(12) United States Patent
Haase et al.

(10) Patent No.: US 9,104,330 B1
(45) Date of Patent: Aug. 11, 2015

(54) SYSTEM AND METHOD FOR INTERLEAVING STORAGE

(75) Inventors: David Haase, Fuquay Varina, NC (US);
Michael D. Haynes, Raleigh, NC (US);
Miles A. de Forest, Bahama, NC (US);
Paul T. McGrath, Raleigh, NC (US);
Dayanand Suldhal, New Canaan, CT (US); Nagapraveen Veeravenkata Seela, Cary, NC (US); Alan L. Taylor, Cary, NC (US)

(73) Assignee: EMC Corporation, Hopkinton, MA (US)

( * ) Notice: Subject to any disclaimer, the term of this patent is extended or adjusted under 35 U.S.C. 154(b) by 154 days.

(21) Appl. No.: 13/539,420

(22) Filed: Jun. 30, 2012

(51) Int. Cl.
*G06F 12/00* (2006.01)
*G06F 3/06* (2006.01)
*G06F 12/06* (2006.01)
*G06F 12/02* (2006.01)

(52) U.S. Cl.
CPC ............ *G06F 3/0644* (2013.01); *G06F 3/0665* (2013.01); *G06F 12/0223* (2013.01); *G06F 12/0607* (2013.01)

(58) Field of Classification Search
CPC ............ G06F 12/0607; G06F 12/0223; G06F 13/1647; G06F 15/7857; G06F 2212/262; G06F 2212/263; G06F 3/067; G06F 3/0689
See application file for complete search history.

(56) References Cited

U.S. PATENT DOCUMENTS

| | | | | |
|---|---|---|---|---|
| 5,129,088 A | * | 7/1992 | Auslander et al. | 711/1 |
| 5,166,939 A | * | 11/1992 | Jaffe et al. | 714/766 |
| 5,905,995 A | * | 5/1999 | Tabuchi et al. | 711/114 |
| 6,247,099 B1 | * | 6/2001 | Skazinski et al. | 711/141 |
| 6,247,103 B1 | * | 6/2001 | Kern et al. | 711/162 |
| 6,327,638 B1 | * | 12/2001 | Kirby | 711/4 |
| 6,934,804 B2 | * | 8/2005 | Hashemi | 711/114 |
| 2002/0194427 A1 | * | 12/2002 | Hashemi | 711/114 |
| 2003/0145167 A1 | * | 7/2003 | Tomita | 711/114 |
| 2004/0034736 A1 | * | 2/2004 | Horn | 711/114 |
| 2005/0091469 A1 | * | 4/2005 | Chiu et al. | 711/203 |
| 2009/0157942 A1 | * | 6/2009 | Kulkarni | 711/6 |
| 2009/0276566 A1 | * | 11/2009 | Coatney et al. | 711/114 |
| 2010/0011176 A1 | * | 1/2010 | Burkey | 711/157 |
| 2010/0293349 A1 | * | 11/2010 | Lionetti et al. | 711/162 |

* cited by examiner

*Primary Examiner* — Cheng-Yuan Tseng
*Assistant Examiner* — Francisco Grullon
(74) *Attorney, Agent, or Firm* — Brian J. Colandreo; Mark H. Whittenberger; Holland & Knight LLP

(57) ABSTRACT

A method, computer program product, and computing system for identifying a target storage device upon which a plurality of logical storage devices are to be defined. The target storage device includes a plurality of physical storage blocks. At least a first logical storage device and a second logical storage device are defined for mapping within the target storage device. Each of the first and second logical storage devices includes a plurality of logical storage slices. At least a portion of the logical storage slices for each of the first and second logical storage devices are non-sequentially mapped to at least a portion of the plurality of physical storage blocks included within the target storage device to generate an interlaced target storage device.

18 Claims, 6 Drawing Sheets

SYSTEM AND METHOD FOR INTERLEAVING STORAGE

TECHNICAL FIELD

This disclosure relates to storage devices and, more particularly, to interleaved storage devices.

BACKGROUND

Storing and safeguarding electronic content is of paramount importance in modern business. Accordingly, various systems may be employed to protect such electronic content.

Unfortunately, when logical drives are mapped onto physical storage devices, the manner in which the logical drives may be mapped onto the physical storage devices may result in poor performance. Specifically and unfortunately, a logical drive may be fully and sequentially mapped to one discrete portion of the physical storage device, resulting in high levels of delay and latency when requesting data from the logical drive if the read head of the physical storage device is positioned distant from the discrete portion of the physical storage device to which the logical drive was mapped.

SUMMARY OF DISCLOSURE

In a first implementation, a computer-implemented method includes identifying a target storage device upon which a plurality of logical storage devices are to be defined. The target storage device includes a plurality of physical storage blocks. At least a first logical storage device and a second logical storage device are defined for mapping within the target storage device. Each of the first and second logical storage devices includes a plurality of logical storage slices. At least a portion of the logical storage slices for each of the first and second logical storage devices are non-sequentially mapped to at least a portion of the plurality of physical storage blocks included within the target storage device to generate an interlaced target storage device.

One or more of the following features may be included. The target storage device may be a rotational, electro-mechanical storage device. The rotational, electro-mechanical storage device may be chosen from the group consisting of: a SATA drive, a SCSI drive, an SAS drive, an IDE drive, and an EIDE drive. A first and a second physical storage block associated with the first logical storage device may be separated by at least one physical storage block associated with the second logical storage device. At least a third logical storage device may be defined for mapping within the target storage device. The third logical storage device may include a plurality of logical storage slices. At least a portion of the logical storage slices for the third logical storage device may be non-sequentially mapped to at least a portion of the plurality of physical storage blocks included within the target storage device to generate the interlaced target storage device. The target storage device may be included within a computing system. The target storage device may be included within a data array.

In another implementation, a computer program product resides on a computer readable medium that has a plurality of instructions stored on it. When executed by a processor, the instructions cause the processor to perform operations including identifying a target storage device upon which a plurality of logical storage devices are to be defined. The target storage device includes a plurality of physical storage blocks. At least a first logical storage device and a second logical storage device are defined for mapping within the target storage device. Each of the first and second logical storage devices includes a plurality of logical storage slices. At least a portion of the logical storage slices for each of the first and second logical storage devices are non-sequentially mapped to at least a portion of the plurality of physical storage blocks included within the target storage device to generate an interlaced target storage device.

One or more of the following features may be included. The target storage device may be a rotational, electro-mechanical storage device. The rotational, electro-mechanical storage device may be chosen from the group consisting of: a SATA drive, a SCSI drive, an SAS drive, an IDE drive, and an EIDE drive. A first and a second physical storage block associated with the first logical storage device may be separated by at least one physical storage block associated with the second logical storage device. At least a third logical storage device may be defined for mapping within the target storage device. The third logical storage device may include a plurality of logical storage slices. At least a portion of the logical storage slices for the third logical storage device may be non-sequentially mapped to at least a portion of the plurality of physical storage blocks included within the target storage device to generate the interlaced target storage device. The target storage device may be included within a computing system. The target storage device may be included within a data array.

In another implementation, a computing system includes at least one processor and at least one memory architecture coupled with the at least one processor, wherein the computing system is configured to perform operations including identifying a target storage device upon which a plurality of logical storage devices are to be defined. The target storage device includes a plurality of physical storage blocks. At least a first logical storage device and a second logical storage device are defined for mapping within the target storage device. Each of the first and second logical storage devices includes a plurality of logical storage slices. At least a portion of the logical storage slices for each of the first and second logical storage devices are non-sequentially mapped to at least a portion of the plurality of physical storage blocks included within the target storage device to generate an interlaced target storage device.

One or more of the following features may be included. The target storage device may be a rotational, electro-mechanical storage device. The rotational, electro-mechanical storage device may be chosen from the group consisting of: a SATA drive, a SCSI drive, an SAS drive, an IDE drive, and an EIDE drive. A first and a second physical storage block associated with the first logical storage device may be separated by at least one physical storage block associated with the second logical storage device. At least a third logical storage device may be defined for mapping within the target storage device. The third logical storage device may include a plurality of logical storage slices. At least a portion of the logical storage slices for the third logical storage device may be non-sequentially mapped to at least a portion of the plurality of physical storage blocks included within the target storage device to generate the interlaced target storage device. The target storage device may be included within a computing system. The target storage device may be included within a data array.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
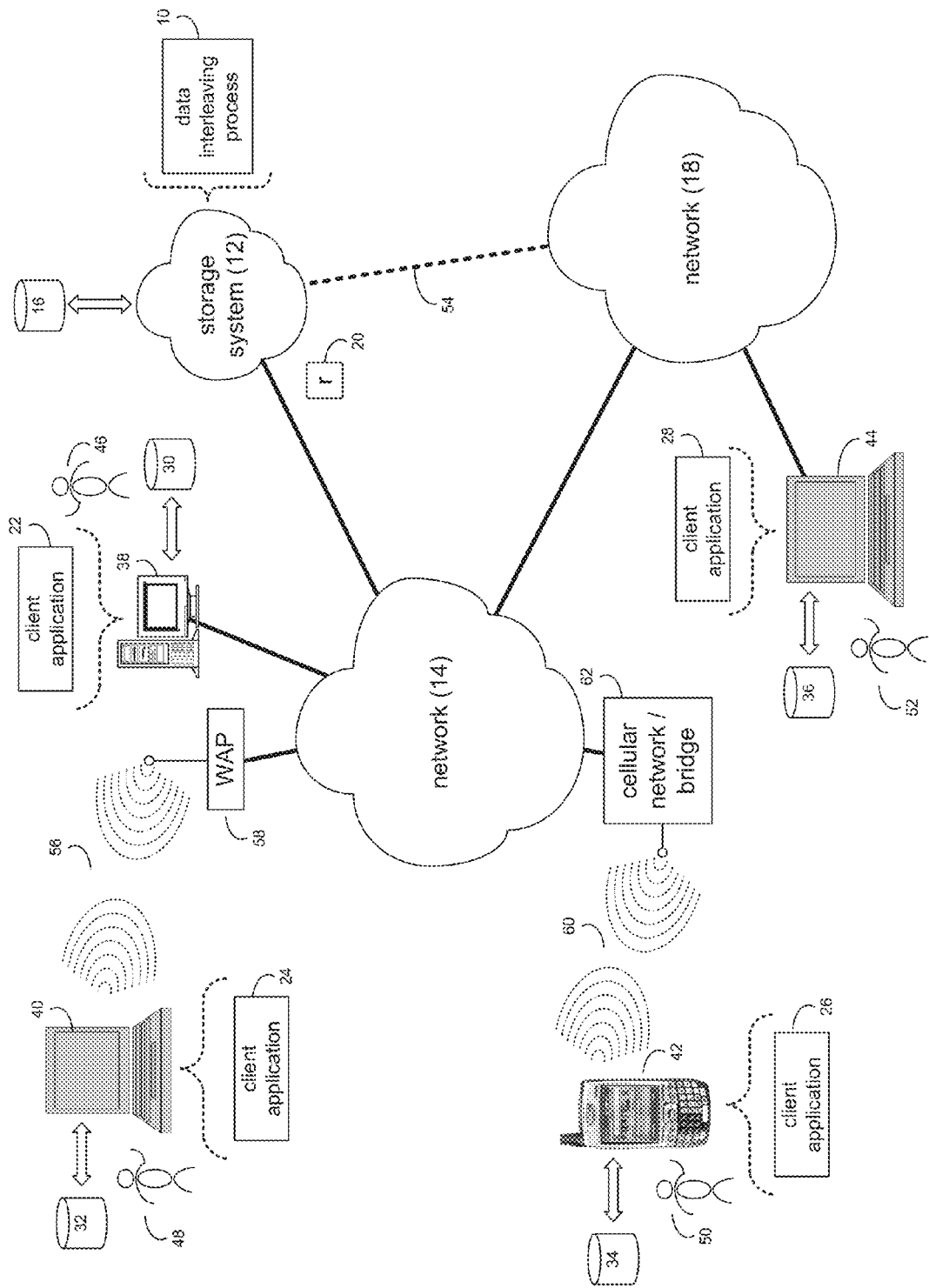
FIG. 1 is a diagrammatic view of a storage system and a data interleaving process coupled to a distributed computing network.

System Overview:

Referring to FIG. 1, there is shown data interleaving process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows XP Server™; Novell Netware™; Redhat Linux™, Unix, or a custom operating system, for example.

The instruction sets and subroutines of data interleaving process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various data requests (e.g. data request 20) may be sent from client applications 22, 24, 26, 28 to storage system 12. Examples of data request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, personal digital assistant 42, notebook computer 44, a server (not shown), a data-enabled, cellular telephone (not shown), and a dedicated network device (not shown).

Client electronic devices 38, 40, 42, 44 may each execute an operating system, examples of which may include but are not limited to Microsoft Windows™, Microsoft Windows CE™, Redhat Linux™, or a custom operating system.

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

For the following discussion, client application 22 is going to be described for illustrative purposes. However, this is not intended to be a limitation of this disclosure, as other client applications (e.g., client applications 24, 26, 28) may be equally utilized.

For illustrative purposes, storage system 12 will be described as being a network-based storage system that includes a plurality of rotating, electro-mechanical backend storage devices. However, this is for illustrative purposes only and is not intended to be a limitation of this disclosure, as other configurations are possible and are considered to be within the scope of this disclosure. For example and as discussed above, storage system 12 may be a personal computer that includes a single electro-mechanical storage device.

Figure 2:
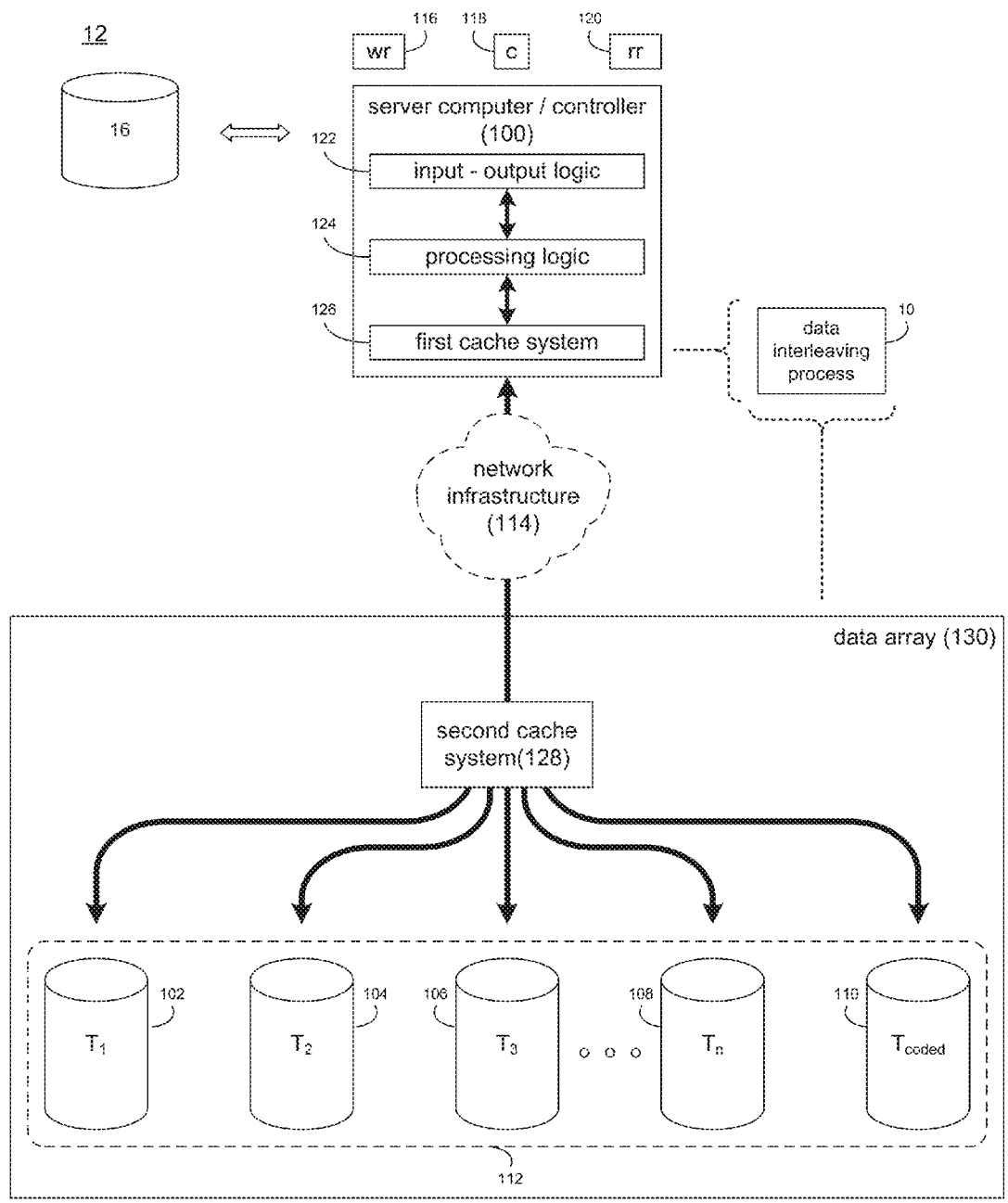
FIG. 2 is a diagrammatic view of the storage system of FIG. 1.

Referring also to FIG. 2, storage system 12 may include a server computer/controller (e.g. server computer/controller 100), and a plurality of storage targets $T_{1-n}$ (e.g. storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for illustrative purposes only and is not intended to be a limitation of this disclosure, as other configurations are possible. For example, storage targets 102, 104, 106, 108 may be configured in a non-RAID fashion or as a RAID 3, RAID 4, RAID 5 or RAID 6 array.

While in this particular example, storage system 12 is shown to include four storage targets (e.g. storage targets 102, 104, 106, 108), this is for illustrative purposes only and is not intended to be a limitation of this disclosure. Specifically, the actual number of storage targets may be increased or decreased depending upon e.g. the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for illustrative purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more rotational, electro-mechanical hard disk drives, wherein a combination of storage targets 102, 104, 106, 108 and coded target 110 may form non-volatile, electro-mechanical memory system 112. Examples of the rotational, electro-mechanical hard disk drives may include but are not limited to SATA drives, SCSI drives, SAS drives, IDE drives, and EIDE drives.

The manner in which storage system 12 is implemented may vary depending upon e.g. the level of redundancy/performance/capacity required. For example, storage system 12 may be a RAID device in which server computer/controller 100 is a RAID controller card and storage targets 102, 104, 106, 108 and/or coded target 110 are individual "hot-swappable" hard disk drives. An example of such a RAID device may include but is not limited to an NAS device. Alternatively, storage system 12 may be configured as a SAN, in which server computer/controller 100 may be e.g., a server computer and each of storage targets 102, 104, 106, 108 and/or coded target 110 may be a RAID device and/or computer-based hard disk drive. Further still, one or more of storage targets 102, 104, 106, 108 and/or coded target 110 may be a SAN.

In the event that storage system 12 is configured as a SAN, the various components of storage system 12 (e.g. server computer/controller 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of data interleaving process 10. The instruction sets and subroutines of data interleaving process 10, which may be stored on a storage device (e.g., storage device 16) coupled to server computer/controller 100, may be executed by one or more processors (not shown) and one or more memory architectures (not shown) included within server computer/controller 100. Storage device 16 may include but is not limited to: a hard disk drive; a tape drive; an optical drive; a RAID device; a random access memory (RAM); a read-only memory (ROM); and all forms of flash memory storage devices.

As discussed above, various data requests (e.g. data request 20) may be generated. For example, these data requests may be sent from client applications 22, 24, 26, 28 to storage system 12. Additionally/alternatively and when server computer/controller 100 is configured as an application server, these data requests may be internally generated within server computer/controller 100. Examples of data request 20 may include but are not limited to data write request 116 (i.e. a request that content 118 be written to storage system 12) and data read request 120 (i.e. a request that content 118 be read from storage system 12).

Server computer/controller 100 may include input-output logic 122 (e.g., a network interface card or a Host Bus Adaptor (HBA)), processing logic 124, and first cache system 126. Examples of first cache system 126 may include but are not limited to a volatile, solid-state, cache memory system (e.g., a dynamic RAM cache memory system) and/or a non-volatile, solid-state, cache memory system (e.g., a flash-based, cache memory system).

During operation of server computer/controller 100, content 118 to be written to storage system 12 may be received by input-output logic 122 (e.g. from network 14 and/or network 18) and processed by processing logic 124. Additionally/alternatively and when server computer/controller 100 is configured as an application server, content 118 to be written to storage system 12 may be internally generated by server computer/controller 100. As will be discussed below in greater detail, processing logic 124 may initially store content 118 within first cache system 126.

Depending on the manner in which first cache system 126 is configured, processing logic 124 may immediately write content 118 to second cache system 128/non-volatile, electro-mechanical memory system 112 (if first cache system 126 is configured as a write-through cache) or may subsequently write content 118 to second cache system 128/non-volatile, electro-mechanical memory system 112 (if first cache system 126 is configured as a write-back cache). Additionally and in certain configurations, processing logic 124 may calculate and store coded data on coded target 110 (included within non-volatile, electromechanical memory system 112) that may allow for the regeneration of data lost/corrupted on one or more of storage targets 102, 104, 106, 108. For example, if processing logic 124 was included within a RAID controller card or a NAS/SAN controller, processing logic 124 may calculate and store coded data on coded target 110. However, if processing logic 124 was included within e.g., an application server, data array 130 may calculate and store coded data on coded target 110.

Examples of second cache system 128 may include but are not limited to a volatile, solid-state, cache memory system (e.g., a dynamic RAM cache memory system) and/or a non-volatile, solid-state, cache memory system (e.g., a flash-based, cache memory system).

The combination of second cache system 128 and non-volatile, electromechanical memory system 112 may form data array 130, wherein first cache system 126 may be sized so that the number of times that data array 130 is accessed may be reduced. Accordingly, by sizing first cache system 126 so that first cache system 126 retains a quantity of data sufficient to satisfy a significant quantity of data requests (e.g., data request 20), the overall performance of storage system 12 may be enhanced.

Further, second cache system 128 within data array 130 may be sized so that the number of times that non-volatile, electromechanical memory system 112 is accessed may be reduced. Accordingly, by sizing second cache system 128 so that second cache system 128 retains a quantity of data sufficient to satisfy a significant quantity of data requests (e.g., data request 20), the overall performance of storage system 12 may be enhanced.

As discussed above, the instruction sets and subroutines of data interleaving process 10, which may be stored on storage device 16 included within storage system 12, may be executed by one or more processors (not shown) and one or more memory architectures (not shown) included within storage system 12. Accordingly, in addition to being executed on server computer/controller 100, some or all of the instruction sets and subroutines of data interleaving process 10 may be executed by one or more processors (not shown) and one or more memory architectures (not shown) included within data array 130.

Figure 3:
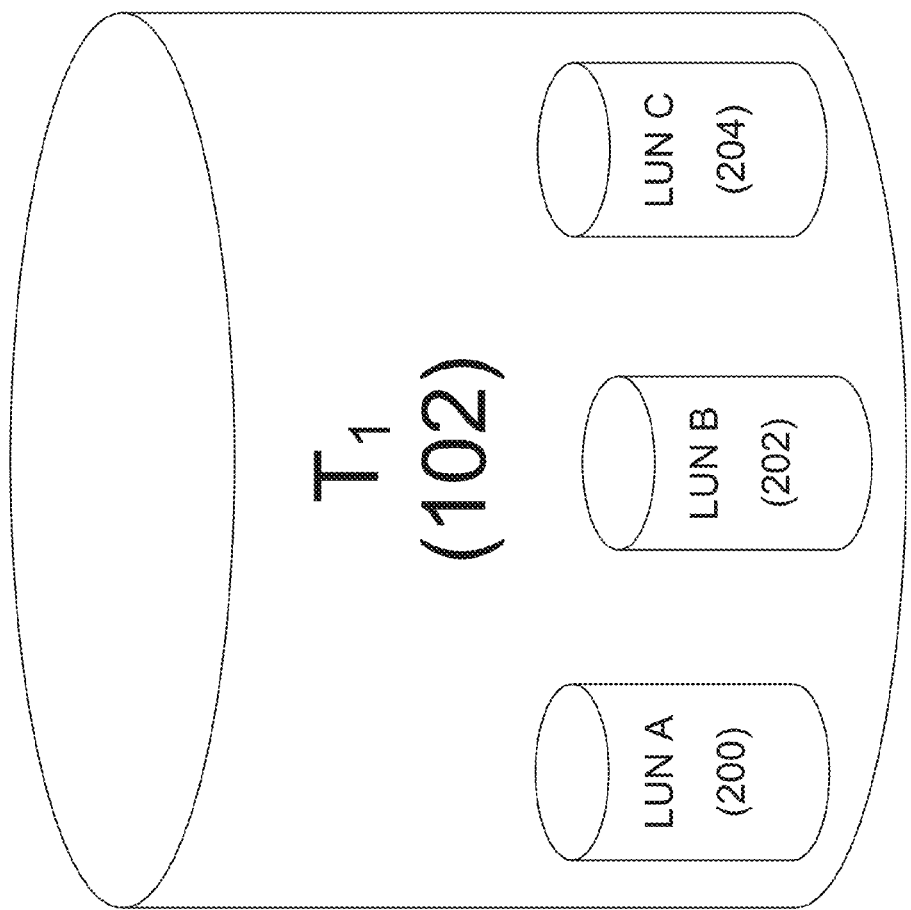
FIG. 3 is a diagrammatic view of a target storage device and a plurality of logical storage devices mapped using the data interleaving process of FIG. 1.

The Data Interleaving Process:

The various storage targets (e.g. storage targets 102, 104, 106, 108) included within data array 130 may be divided into a plurality of LUNs (i.e., Logical Unit Numbers). As is known in the art, a LUN is a logical storage device that may be "constructed" from various physical portions of a target storage device (e.g. storage targets 102, 104, 106, 108). For example and referring also to FIG. 3, storage target 102 may be logically divided to form e.g. three LUNs, namely LUN 200, LUN 202 and LUN 204.

Figure 4:
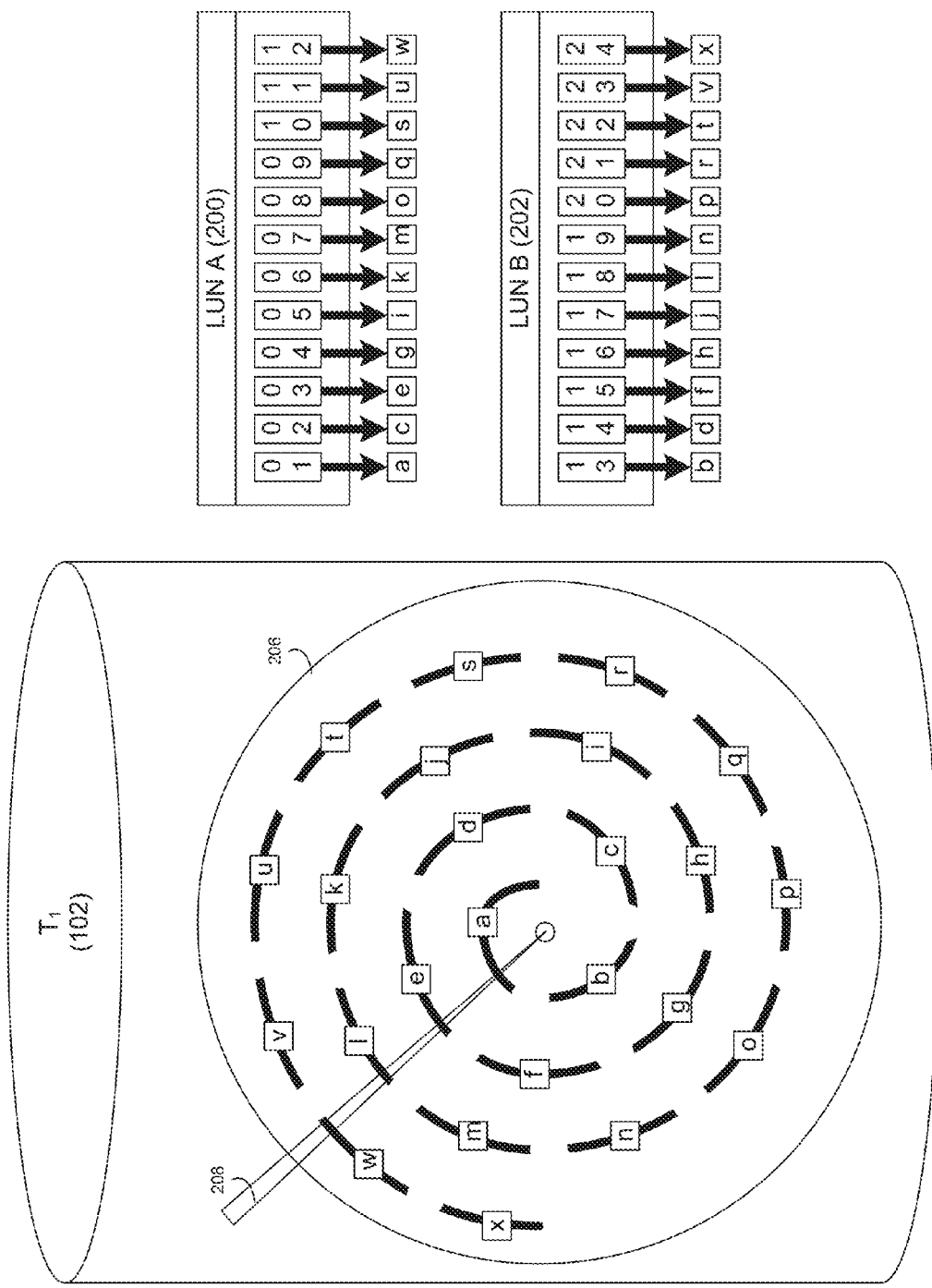
FIG. 4 is a diagrammatic view of a target storage device and two logical storage devices mapped using the data interleaving process of FIG. 1.

Referring also to FIG. 4, storage target 102 may include platter 206 to which data may be written to and/or read from. Storage target 102 may also include read/write head 208 that may be configured to write data to and/or read data from platter 206. Platter 206 may be divided to form a plurality of physical storage blocks (e.g., physical storage blocks A-X), which are physically discrete portions of platter 206.

While platter 206 is shown to be divided into twenty-four portions (namely physical storage blocks A-X), this is for illustrative purposes only and is not intended to be a limitation of this disclosure, as other configurations are possible and are considered to be within the scope of this disclosure.

Figure 5:
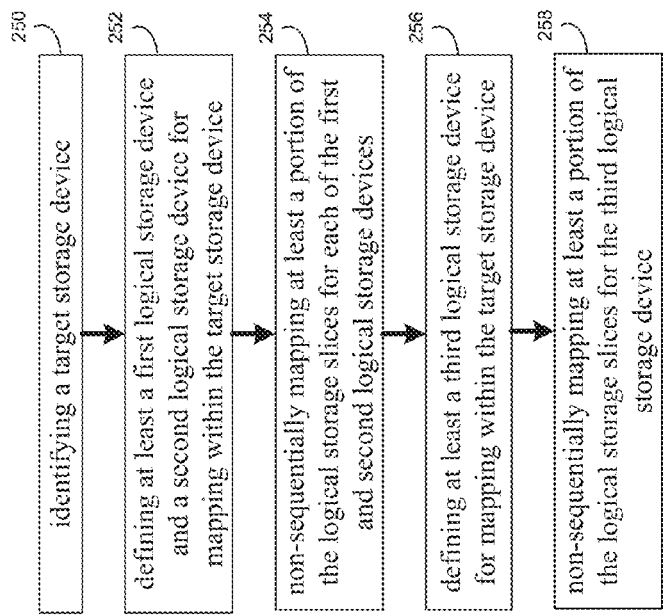
FIG. 5 is a flow chart of the data interleaving process of FIG. 1.

Assume for illustrative purposes that an administrator (e.g., user 46) of storage target 102 would like to generate a plurality of LUNS. Accordingly and referring also to FIG. 5, data interleaving process 10 may identify 250 a target storage device (e.g., storage target 102) upon which a plurality of logical storage devices may be defined. Therefore, data interleaving process 10 may divide the physical storage blocks (e.g., physical storage blocks A-X) of platter 206 to form the required number of LUNS. Assume for illustrative purposes that the administrator (e.g., user 46) wishes to define 252 a first logical storage device (e.g., LUN 200) and a second logical storage device (e.g., LUN 202) for mapping within the target storage device (e.g., storage target 102).

Typically, each of the first and second logical storage devices (e.g., LUN 200 and LUN 202 respectively) is formed from a plurality of logical storage slices having a defined size. Each logical storage slice is a defined logical portion of the logical storage device. For example, LUN 200 is shown to include twelve logical storage slices (namely logical storage slices 01-12). Further, LUN 202 is shown to include twelve logical storage slices (namely logical storage slices 13-24).

Data interleaving process 10 may non-sequentially map 254 at least a portion of the logical storage slices for each of the first and second logical storage devices (e.g., LUNs 200, 202) to at least a portion of the plurality of physical storage blocks included within the target storage device (e.g., storage target 102) to generate an interlaced target storage device. For example and when defining 252 LUNs 200, 202, data interleaving process 10 may non-sequentially map 254 the logical storage slices (e.g., logical storage slices 01-12) associated with LUN 200 and the logical storage slices (e.g., logical storage slices 13-24) associated with LUN 202 to some or all of the physical storage blocks (e.g., physical storage blocks A-X) included within the target storage device (e.g., storage target 102) to generate an interlaced target storage device.

For example, a first and a second physical storage block (e.g., physical storage block A & C of storage target 102) associated with the first logical storage device (e.g., LUN 200) may be separated by at least one physical storage block (e.g., physical storage block B storage target 102) associated with the second logical storage device (LUN 202).

As can be seen in FIG. 4, the logical storage slices of LUN 200 (namely logical storage slices 01-12) are interleaved (i.e., interspersed) with the logical storage slices of LUN 202 (namely logical storage slices 13-24). Accordingly, logical storage slices 01-12 of LUN 200 may be non-sequentially mapped 254 to physical storage blocks A, C, E, G, I, K, M, O, Q, S, U, W (respectively) of storage target 102. Further, logical storage slices 13-24 of LUN 202 may be non-sequentially mapped 254 to physical storage blocks B, D, F, H, J, L, N, P, R, T, V, X (respectively) of storage target 102. Accordingly and with respect to storage target 102, the physical storage blocks are allocated as follows: A (LUN 200), B (LUN 202), C (LUN 200), D (LUN 202), E (LUN 200), F (LUN 202), G (LUN 200), H (LUN 202), I (LUN 200), J (LUN 202), K (LUN 200), L (LUN 202), M (LUN 200), N (LUN 202), O (LUN 200), P (LUN 202), Q (LUN 200), R (LUN 202), S (LUN 200), T (LUN 202), U (LUN 200), V (LUN 202), W (LUN 200), and X (LUN 202).

Figure 6:
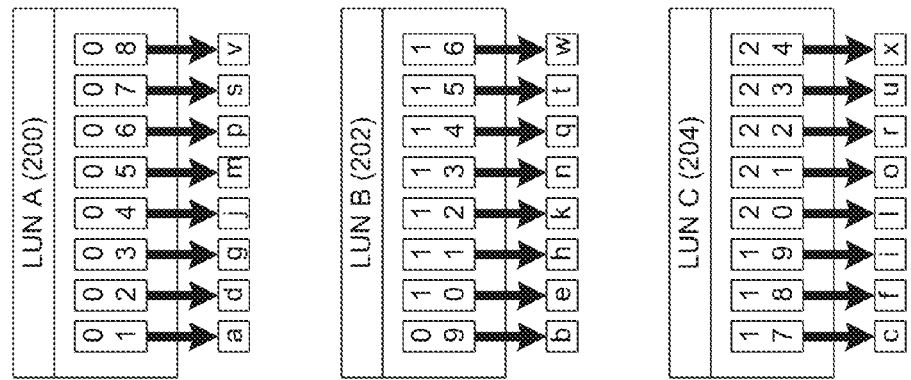
FIG. 6 is a diagrammatic view of a target storage device and three logical storage devices mapped using the data interleaving process of FIG. 1.
Figure 6:
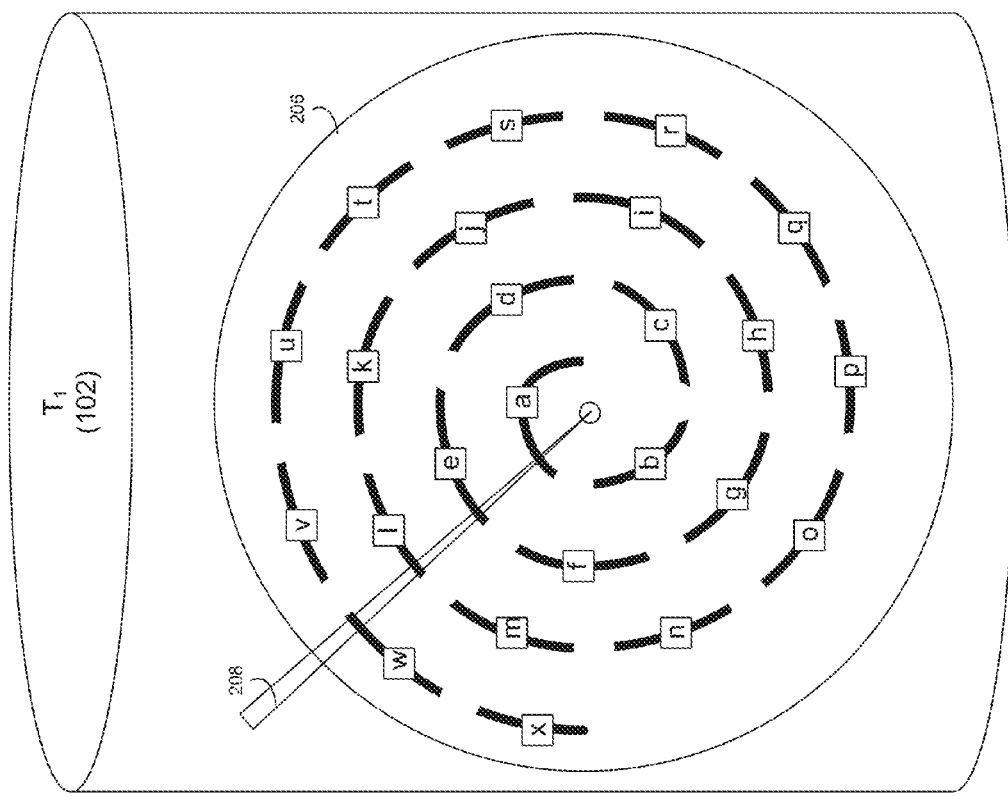

Referring also to FIG. 6, assume for illustrative purposes that the administrator (e.g., user 46) wishes to define 256 at least a third logical storage device (e.g., LUN 204) for mapping within the target storage device (e.g., storage target 102).

Assume that each of the first, second and third logical storage devices (e.g., LUN 200, LUN 202 and LUN 204 respectively) is formed from a plurality of logical storage slices having a defined size, wherein each logical storage slice is a defined logical portion of the logical storage device. For example, LUN 200 is shown to include eight logical storage slices (namely logical storage slices 01-08), LUN 202 is shown to include eight logical storage slices (namely logical storage slices 9-16) and LUN 204 is shown to include eight logical storage slices (namely logical storage slices 17-24).

Data interleaving process 10 may non-sequentially map 258 at least a portion of the logical storage slices for each of the first, second and third logical storage devices (e.g., LUNs 200, 202, 204) to at least a portion of the plurality of physical storage blocks included within the target storage device (e.g., storage target 102) to generate an interlaced target storage device. For example and when defining 256 LUNs 200, 202, 204, data interleaving process 10 may non-sequentially map 258 the logical storage slices (e.g., logical storage slices 01-08) associated with LUN 200, the logical storage slices (e.g., logical storage slices 09-16) associated with LUN 202, and the logical storage slices (e.g., logical storage slices 17-24) associated with LUN 204 to some or all of the physical storage blocks (e.g., physical storage blocks A-X) included within the target storage device (e.g., storage target 102) to generate an interlaced target storage device.

As can be seen in FIG. 6, the logical storage slices of LUN 200 (namely logical storage slices 01-08), LUN 202 (namely logical storage slices 09-16), and LUN 204 (namely logical storage slices 17-24) are all interleaved (i.e., interspersed) with one another. Accordingly, logical storage slices 01-08 of LUN 200 may be non-sequentially mapped 258 to physical storage blocks A, D, G, J, M, P, S, V (respectively) of storage target 102. Further, logical storage slices 09-16 of LUN 202 may be non-sequentially mapped 258 to physical storage blocks B, E, H, K, N, Q, T, W (respectively) of storage target 102. Additionally, logical storage slices 17-24 of LUN 204 may be non-sequentially mapped 258 to physical storage blocks C, F, I, L, 0, R, U, X (respectively) of storage target 102. Accordingly and with respect to storage target 102, the physical storage blocks are allocated as follows: A (LUN 200), B (LUN 202), C (LUN 204), D (LUN 200), E (LUN 202), F (LUN 204), G (LUN 200), H (LUN 202), I (LUN 204), J (LUN 200), K (LUN 202), L (LUN 204), M (LUN 200), N (LUN 202), O (LUN 204), P (LUN 200), Q (LUN 202), R (LUN 204), S (LUN 200), T (LUN 202), U (LUN 204), V (LUN 200), W (LUN 202), and X (LUN 204).

While storage target 102 is described above as being included within data array 130, this is for illustrative purposes only and is not intended to be a limitation of this disclosure, as other configurations are possible and are considered to be within the scope of this disclosure. For example, storage target 102 may be included within a traditional computing system, such as a personal computer, a server computer, a series of server computers, a mini computer, and a mainframe computer.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
   identifying a target storage device upon which a plurality of logical storage devices are to be defined, wherein the target storage device includes a plurality of physical storage blocks, wherein the target storage device is a singular rotational, electro-mechanical storage device;
   defining at least a first logical storage device and a second logical storage device for mapping within the target storage device, wherein each of the first and second logical storage devices includes a plurality of logical storage slices having a defined size, wherein each of the logical storage devices includes its own logical unit number;
   mapping sequential physical storage blocks of a platter within the rotational, electro-mechanical storage device to consecutive and different logical storage devices included within the target storage device to generate a singular interlaced target storage device.

2. The method of claim 1 wherein the rotational, electro-mechanical storage device is chosen from the group consisting of: a SATA (serial advanced technology attachment) drive, a SCSI (small computer system interface) drive, an SAS (serial attached SCSI) drive, an IDE (integrated drive electronics) drive, and an EIDE (extended integrated drive electronic) drive.

3. The method of claim 1 wherein a first and a second physical storage block associated with the first logical storage device are separated by at least one physical storage block associated with the second logical storage device.

4. The method of claim 1 further comprising:
   defining at least a third logical storage device for mapping within the target storage device, wherein the third logical storage device includes a plurality of logical storage slices; and
   non-sequentially mapping at least a portion of the logical storage slices for the third logical storage device to at least a portion of the plurality of physical storage blocks included within the target storage device to generate the interlaced target storage device.

5. The method of claim 1 wherein the target storage device is included within a computing system.

6. The method of claim 1 wherein the target storage device is included within a data array.

7. A computer program product residing on a non-transitory computer readable medium having a plurality of instructions stored thereon which, when executed by a processor, cause the processor to perform operations comprising:
   identifying a target storage device upon which a plurality of logical storage devices are to be defined, wherein the target storage device includes a plurality of physical storage blocks, wherein the target storage device is a singular rotational, electro-mechanical storage device;
   defining at least a first logical storage device and a second logical storage device for mapping within the target storage device, wherein each of the first and second logical storage devices includes a plurality of logical storage slices having a defined size, wherein each of the logical storage devices includes its own logical unit number;
   mapping sequential physical storage blocks of a platter within the rotational, electro-mechanical storage device to consecutive and different logical storage devices included within the target storage device to generate a singular interlaced target storage device.

8. The computer program product of claim 7 wherein the rotational, electro-mechanical storage device is chosen from the group consisting of: a SATA (serial advanced technology attachment) drive, a SCSI (small computer system interface) drive, an SAS (serial attached SCSI) drive, an IDE (integrated drive electronics) drive, and an EIDE (extended integrated drive electronic) drive.

9. The computer program product of claim 7 wherein a first and a second physical storage block associated with the first logical storage device are separated by at least one physical storage block associated with the second logical storage device.

10. The computer program product of claim 7 further comprising instructions for:
    defining at least a third logical storage device for mapping within the target storage device, wherein the third logical storage device includes a plurality of logical storage slices; and
    non-sequentially mapping at least a portion of the logical storage slices for the third logical storage device to at least a portion of the plurality of physical storage blocks included within the target storage device to generate the interlaced target storage device.

11. The computer program product of claim 7 wherein the target storage device is included within a computing system.

12. The computer program product of claim 7 wherein the target storage device is included within a data array.

13. A computing system including at least one processor and at least one memory architecture coupled with the at least one processor, wherein the computing system is configured to perform operations comprising:

identifying a target storage device upon which a plurality of logical storage devices are to be defined, wherein the target storage device includes a plurality of physical storage blocks, wherein the target storage device is a singular rotational, electro-mechanical storage device;

defining at least a first logical storage device and a second logical storage device for mapping within the target storage device, wherein each of the first and second logical storage devices includes a plurality of logical storage slices having a defined size, wherein each of the logical storage devices includes its own logical unit number;

mapping sequential physical storage blocks of a platter within the rotational, electro-mechanical storage device to consecutive and different logical storage devices included within the target storage device to generate a singular interlaced target storage device.

14. The computing system of claim 13 wherein the rotational, electro-mechanical storage device is chosen from the group consisting of: a SATA (serial advanced technology attachment) drive, a SCSI (small computer system interface) drive, an SAS (serial attached SCSI) drive, an IDE (integrated drive electronics) drive, and an EIDE (extended integrated drive electronic) drive.

15. The computing system of claim 13 wherein a first and a second physical storage block associated with the first logical storage device are separated by at least one physical storage block associated with the second logical storage device.

16. The computing system of claim 13 further configured to perform operations comprising:

defining at least a third logical storage device for mapping within the target storage device, wherein the third logical storage device includes a plurality of logical storage slices; and non-sequentially mapping at least a portion of the logical storage slices for the third logical storage device to at least a portion of the plurality of physical storage blocks included within the target storage device to generate the interlaced target storage device.

17. The computing system of claim 13 wherein the target storage device is included within a computing system.

18. The computing system of claim 13 wherein the target storage device is included within a data array.

* * * * *